Sept. 16, 1941.     G. A. WAHLMARK     2,255,993
FLUID TRANSMISSION
Filed Sept. 9, 1938     4 Sheets-Sheet 2
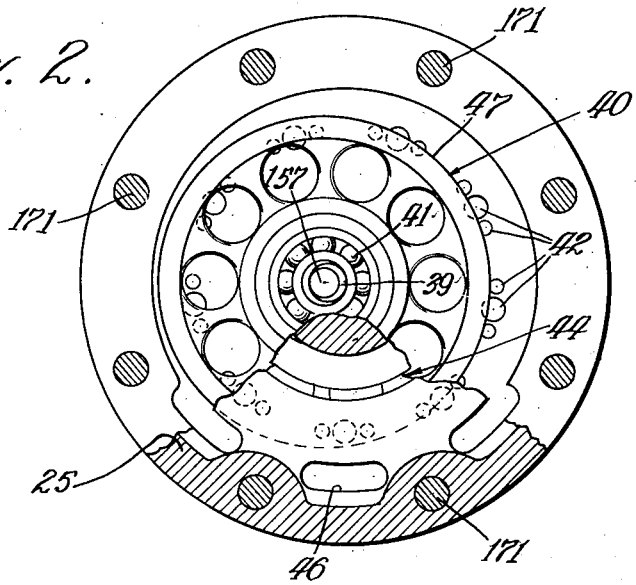
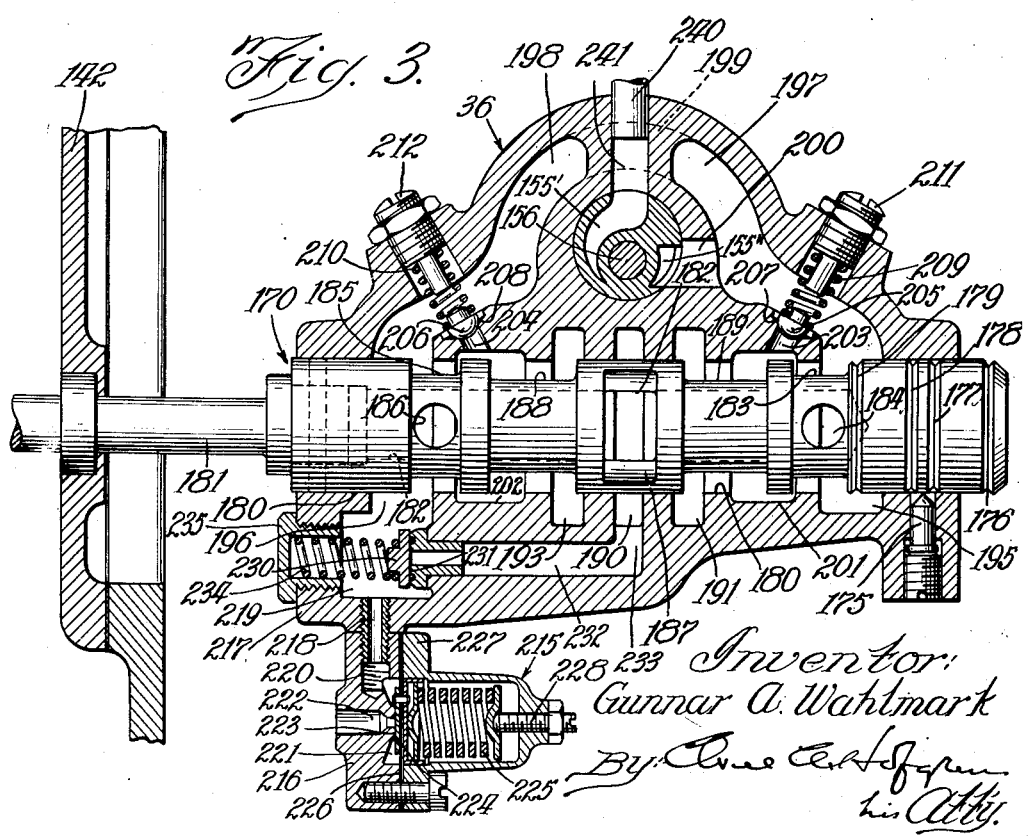
Inventor:
Gunnar A. Wahlmark Sept. 16, 1941.            G. A. WAHLMARK            2,255,993

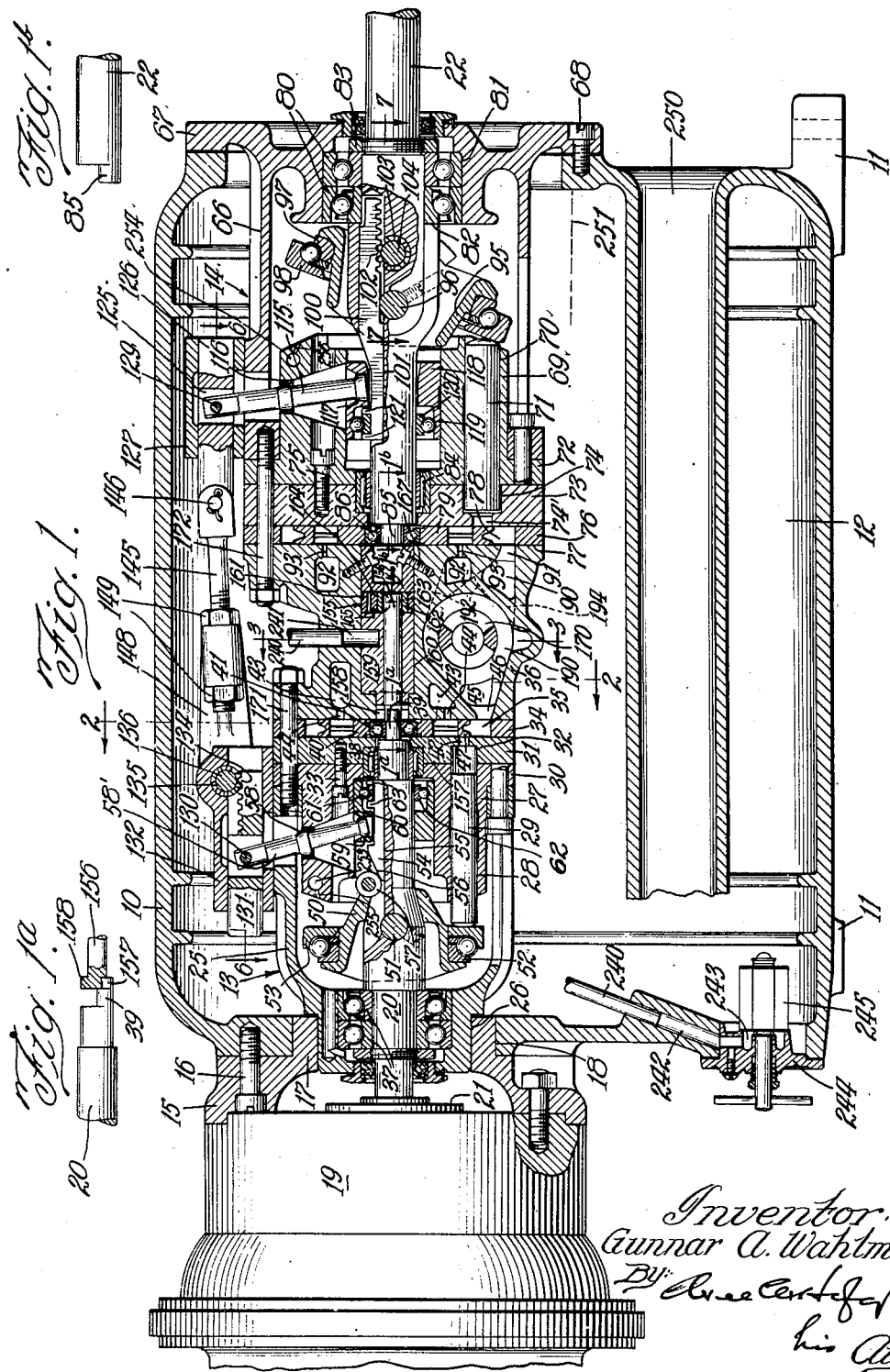

FLUID TRANSMISSION

Filed Sept. 9, 1938            4 Sheets-Sheet 3

Inventor:
Gunnar A. Wahlmark
By [signature]
his Atty.

Sept. 16, 1941.  G. A. WAHLMARK  2,255,993
FLUID TRANSMISSION
Filed Sept. 9, 1938   4 Sheets-Sheet 4
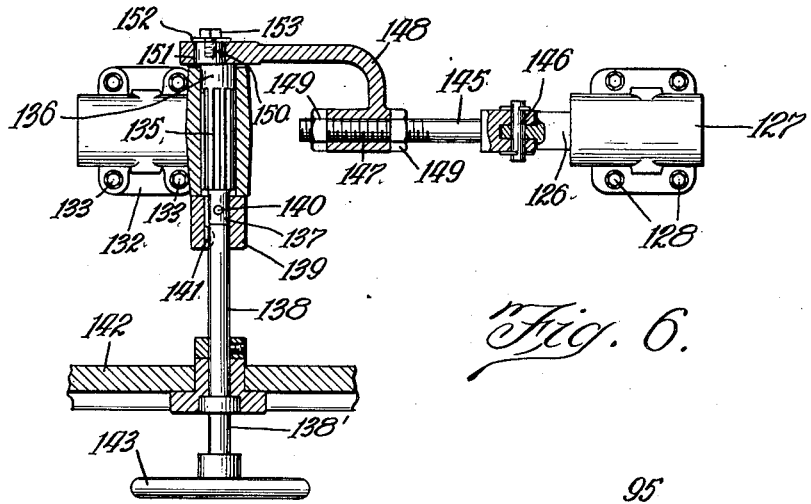
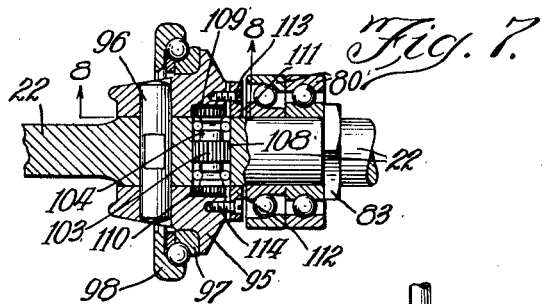
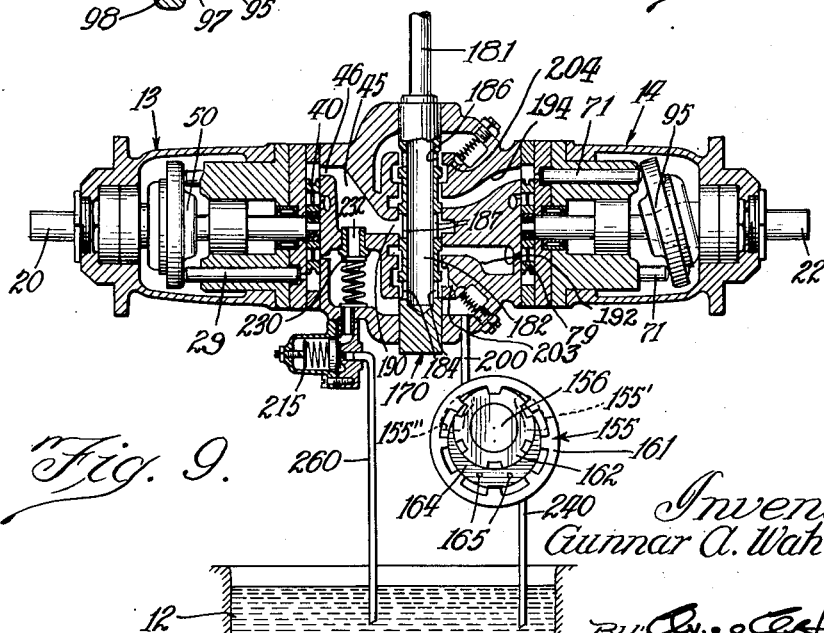
Inventor:
Gunnar A. Wahlmark Patented Sept. 16, 1941

2,255,993

UNITED STATES PATENT OFFICE 2,255,993

FLUID TRANSMISSION

Gunnar A. Wahlmark, Rockford, Ill.

Application September 9, 1938, Serial No. 229,223

9 Claims. (Cl. 60—53)

More particularly, the invention relates to a fluid transmission for operating a driven shaft at a speed different from that of a drive shaft, it being the general object of the invention to provide a new and improved mechanism of this type.

Another object is to provide a new and improved fluid transmission having a fluid pump adapted to be driven by a prime mover and a fluid motor together with a circuit connecting the pump and motor, including a pumping device for supplying fluid under pressure to the intake of the pump and the outlet of the motor.

Another object is to provide a new and improved fluid transmission embodying a fluid pump, a fluid motor, a circuit connecting the pump outlet to the motor inlet, and the motor outlet to the pump inlet, and valve mechanism for controlling the flow of fluid in the circuit and operable to start and stop the motor and to change its direction of rotation.

Another object is to provide a fluid transmission having a fluid motor with means for braking the motor operable to restrict the fluid flowing from the outlet of the motor while maintaining the supply of fluid to the inlet of the motor.

Another object is to provide a new and improved fluid transmission having a multiple piston variable displacement pump and a multiple piston variable displacement motor, together with control means for simultaneously increasing the stroke of the pump and decreasing the stroke of the motor, and vice versa.

Other objects will become readily apparent from the following detailed description taken in connection with the accompanying drawings, in which:

Fig. 1 is a fragmentary elevation partly in vertical section through the drive and driven shafts of a transmission showing a preferred form of the invention.

Fig. 1a is a fragmentary section along the lines 1a—1a of Fig. 1.

Fig. 1b is a fragmentary section along the lines 1b—1b of Fig. 1.

Fig. 2 is a section along the line 2—2 of Fig. 1.

Fig. 3 is a transverse section approximately along the line 3—3 of Fig. 1 showing the control valve in its neutral position.

Fig. 4 is a similar view showing the control valve in the position for effecting clockwise rotation of the motor, as viewed from the left hand end of Fig. 1.

Fig. 5 is a similar view showing the valve in the position to stop and brake the motor after operation in a clockwise direction.

Fig. 6 is a fragmentary plan view of the unitary control for the pump and motor approximately along the line 6—6 of Fig. 1.

Fig. 7 is a view approximately along the line 7—7 of Fig. 1.

Fig. 8 is a fragmentary section along the line 8—8 of Fig. 7.

Fig. 9 is a diagrammatic representation of the circuit.

While the invention is susceptible of embodiment in many different forms, there is shown in the drawings and hereinafter described in detail one such embodiment, with the understanding that the present disclosure is to be considered as an exemplification of the principles of the invention and is not intended to limit the invention to the embodiment illustrated. The scope of the invention will be pointed out in the appended claims.

In the form shown in the drawings, the invention comprises a casing 10 having suitable supporting brackets 11 formed integrally therewith. The lower portion of the casing forms a fluid reservoir 12, whereas the upper portion of the casing contains a multiple piston fluid pump designated generally 13 and a multiple piston fluid motor designated generally 14. An annular adapter 15 is secured to the left hand end of the casing by means of a plurality of bolts 16 and has a flange 17 projecting into an opening 18 in the end wall of the casing. This adapter is arranged to support a prime mover 19 herein shown in the form of an electric motor.

The pump 13 has a shaft 20 axially aligned and connected to the prime mover shaft by means of a coupling device 21. The fluid motor 14 has a shaft 22 projecting out through the right hand end of the casing so as to be available for connection to the mechanism to be driven. As illustrated herein, the shafts of the prime mover, the pump 13, and the motor 14 are in axial alignment.

The pump 13 is of the multiple piston wobbler type and comprises a casing 25 supported at one end in a bore 26 of the adapter flange 17. A cylinder block 27 has a plurality of annularly disposed cylinders 28 in which pistons 29 are reciprocably mounted. The cylinder block has a flange 30 abutting the right hand end of the casing 25. A plate 31 is positioned against the end of the cylinder block and is provided with a plurality of recesses 32 aligned with the cylinders 28 so as to form the head ends thereof, This plate is preferably secured to the cylinder block by means of a plurality of screw devices 33. An annular member or ring 34 is positioned against the plate 31 so as to define the peripheral wall of a valve chamber 35, one end wall of which is formed by the plate 31 and the other by the adjacent end of a housing 36 for the reversing valve mechanism which will hereinafter be more fully described. The pump shaft 20 is rotatably supported at one end by a pair of ball bearings 37 and at its other end by a roller bearing 38. A pin 39 extends eccentrically from the right hand end of the shaft 20 (see Fig. 1a) for the purpose of driving a wheel-like valve member 40 which is mounted on the pin 39 by means of a ball bearing 41. This particular valve mechanism is disclosed in my copending application Serial No. 143,069, filed May 17, 1937, now issued as Patent No. 2,190,812, dated Feb. 20, 1940. Briefly, the plate 31 is provided with cylinder ports 42 and the housing 36 is provided with an arcuate inlet passage 43 connected to inlet ports 44 and an arcuate outlet passage 45 connected to outlet ports 46, the outlets 46 being disposed radially outwardly of the cylinder ports 42, and the inlet ports 44 being disposed radially inwardly of the cylinder ports. The valve 40 has a peripheral flange 47 which, during the eccentric movement of the valve member, alternately connects the cylinder ports 42 with the inlet ports 44 and the outlet ports 46 in the manner more fully described in said prior application.

The pistons 29 of the pump 13 are arranged to be actuated by means of a wobbler device which comprises an annular member 50 which is pivotally mounted on the shaft 20 by means of a pin 51. A ball bearing has one race 52 secured to the member 50 so that the other race 53 engages the adjacent ends of the piston 29. The angular position of the wobbler on the shaft may be adjusted by means of a key-like member 54 which slides in a longitudinal groove 55 in the shaft and has a beveled end 56 which engages a roller 57 mounted on the wobbler member 50. The member 54 may be adjusted longitudinally of the shaft by means including a lever 58' which is pivoted intermediate its ends at 58 on the cylinder block and has its lower end engaging in a hole 59 in a collar 60 which loosely surrounds the shaft 20. The collar 60 forms the outer race of a ball bearing 61, the inner race 62 of which is secured between laterally spaced upstanding lugs 63 on the member 54. It will be readily apparent that by pivoting the lever 58' about its fulcrum 58, the collar 60 will be moved longitudinally of the shaft and that this movement of the collar will effect a similar movement of the member 54 and cause the beveled end 56 thereof to swing the wobbler member 50 in a counterclockwise direction or permit it to swing in a clockwise direction depending upon the direction of movement of the member 54.

The fluid motor 14 is somewhat similar in construction to the fluid pump 13. Thus, the fluid motor has a casing 66 provided with an outwardly extending flange 67 at its right hand end, this flange being attached to the transmission casing 10 by means of a plurality of screw devices 68. An annular cylinder block 69 is positioned in the casing 66 and is provided with a plurality of annularly spaced cylinder bores 70 in which pistons 71 are reciprocable. The cylinder block 69 has an outwardly extending flange 72 at its left hand end positioned against the adjacent end of the casing 66. A plate 73 is positioned against the adjacent end of the cylinder block and has a plurality of recesses 74 aligned with the cylinders 70 so as to form head ends therefor. The plate 73 also has a plurality of cylinder ports 74', one for each cylinder. The plate is secured to the cylinder block by means of a plurality of screw devices 75. An annular member or ring 76 is positioned against the plate 73 and between the plate and the adjacent face 77 of the valve housing 36 so as to define a chamber 78 for a wheel-like valve member 79.

The shaft 22 of the motor 14 is rotatably supported at one end by means of a pair of ball bearings 80, the outer races of which are fitted in a bore 81 in the right hand end of the casing 66. The inner races of the ball bearings are secured against each other and against a shoulder 82 on the shaft 22 by means of a nut 83. The other end of the shaft is mounted in a roller bearing 84, the outer race of which is supported partly in the cylinder block and partly in the plate 73. The shaft is provided with an eccentric pin 85 (Fig. 1b) which drives the valve 79 through an intermediate ball bearing 86.

Here again the valve 79 and its associated ports function in a manner similar to that shown in the hereinbefore mentioned prior application. The adjacent portion of the valve housing 36 has an arcuate passage 90 connecting with a plurality of ports 91 which communicate with the chamber 78 radially outwardly of the cylinder ports 74'. The housing 36 also has an arcute port 92 communicating with a plurality of ports 93 which connect with the chamber 78 radially inwardly of the cylinder ports 74. For a clockwise rotation of the motor shaft, the passage 92 and ports 93 form the inlet to the motor and the passage 90 and the ports 91 form the outlet. For a counterclockwise rotation of the motor shaft, this is reversed.

The motor is provided with an adjustable wobbler comprising an annular member 95 which is pivoted on the shaft 22 by means of a pin 96. A ball bearing has one race 97 secured to the member 95 and has its other race 98 positioned to engage the adjacent ends of the pistons 71. The means for adjusting the wobbler angularly on the shaft comprises a bar 100 reciprocably mounted in a longitudinal slot 101 in the shaft 22 and provided with rack teeth 102 which mesh with a pinion 103 formed on a short shaft 104 (Figs. 1 and 7) rotatably mounted in a transverse bore 105 in the shaft 22. The outer ends of the shaft 104 are formed with pinions 109 and 110 which mesh with internal gear segments 111 and 112 secured to the member 95 by means of screw devices 113 and 114. By reciprocating the rack bar 100, the shaft 104 rotates with the result that the pinions 109 and 110 actuate the wobbler member 95 through the segmental gears 111 and 112. The means for reciprocating the rack bar is similar to that provided for reciprocating the member 54 in the pump. As shown in Fig. 1, this means comprises a lever 115 fulcrumed intermediate its ends at 116 in the cylinder block and positioned with its lower end in a bore 117 formed in a collar 118 loosely surrounding the shaft 22. A portion 119 of this collar forms the outer race of a ball bearing, the inner race 120 of which is fitted intermediate upstanding lugs 121 on the rack bar 100.

In its preferred form, the invention contemplates the provision of a unitary control means for simultaneously adjusting the strokes of the pump 13 and the motor 14. As shown in the drawings, and more particularly in Figs. 1 and 6, the upper end of the motor stroke adjusting lever 115 extends into an opening 125 formed in a cylindrical rod 126 which is slidably mounted in a bracket 127 which is secured to the upper surface of the casing 66 by means of screw devices 128. A pin 129 connects the upper end of the lever to the member 126 and serves as a support for the lever. The upper end of the pump stroke adjusting lever 58' is similarly connected by means of a pin 130 to a cylindrical bar 131 which is reciprocably mounted in a bracket 132 secured to the upper surface of the pump casing 25 by means of screw devices 133. A portion of the bar 131 is formed with teeth 134 which mesh with pinion teeth 135 formed on a shaft 136. The shaft 136 extends transversely of the rack bar 131 and is rotatably mounted in the bracket 132. One end of the shaft 136 projects beyond the bracket 132, as shown in Fig. 6, so that a reduced portion 137 thereof may be coupled to an operating shaft 138 by means of a coupling collar 139 which is secured to the shaft 137 by a pin 140 and is secured to the shaft 138 by means of a key 141. The shaft 138 extends out through the forward wall 142 of the casing 10 and has a projecting end 138' arranged for the reception of a suitable hand wheel 143.

Upon rotation of the shaft 138, the lever 58' will be pivoted about its fulcrum through the intervening rack and pinion connection 134, 135. A connection is provided intermediate the shaft 136 and the member 126 so that the stroke of the motor 14 will be decreased as the stroke of the pump 13 is increased, and vice versa, thus providing for a continuous shift from stand-still to maximum speed of the driven shaft 22. As shown herein, this connection is in the form of a link comprising a rod 145, bifurcated at one end and secured to the member 126 by means of a pin 146. The other end of the rod 145 is threaded at 147 and extends through a bore in an offset connecting member 148, nuts 149 cooperating with the threaded portion of the rod to secure member 148 adjustably to the rod. The other end of the member 148 is secured to one end of the shaft 136 by means of an eccentric 150 which is suitably secured to the shaft 136 or formed integrally therewith and passes through a bore 151 in the member 148. The parts are held together by means of a washer 152 and a set screw 153.

In the present form of the invention, a relatively small constant volume rotary pump designated generally 155 is driven by means of a shaft 156 from the pump shaft 20. As shown most clearly in Fig. 1a, an eccentric pin 157 on the pump shaft engages in an eccentric recess in a flange 158 on the adjacent end of the shaft 156 to form a driving connection therebetween. The shaft 156 is journaled eccentrically in a bushing 159 positioned in a bore 160 in the housing 36. The pump 155 consists of an internally toothed member 161 which is rotatably mounted in the bore 160 adjacent one end of the bushing 159, an externally toothed pinion 162 secured to the shaft 156 by means of a key 163 and a crescent guard member 164 which is secured to the bushing 159 by means of pins 165. This rotary pump may be of the gear type or, preferably, of the type disclosed in my prior application Serial No. 675,218, filed June 10, 1933 now issued as Patent No. 2,132,813, dated October 11, 1938. A cup-shaped member 166 is inserted in the right hand end of the bore 160 (Fig. 1) so as to hold the parts in assembled relationship and is secured to the housing 36 by means of screw devices 167.

It is contemplated that the pump 13 and motor 14 will be incorporated in a fluid circuit with a valve device such as 170 (Figs. 1, 3, 4, 5 and 9) and with the mechanisms as hereinafter set forth, in order to facilitate the starting, stopping, braking and reversing of the motor 14. Portions of this circuit are formed in or attached to the housing 36, which housing in turn is bolted to the pump parts and casing by means of a plurality of bolts 171, and is bolted to the motor parts and casing by means of a plurality of bolts 172 so as to form a structural connection therebetween.

The valve 170, as shown most clearly in Figs. 3, 4 and 5, is of the cylindrical, reciprocatory type and has four operative positions as determined by the engagement of a detent device 175 with annular grooves 176, 177, 178, and 179 formed in one end of the valve. The valve also has a neutral position, as shown in Fig. 3 wherein the detent devise is positioned intermediate the grooves 177 and 178. The cylindrical valve, reciprocable in a bore 180 formed in the housing 36, is operable by means of a stem 181 threaded into and pinned to one end thereof, as shown in Fig. 4. The valve has an axial port 182 which communicates at one end with an annular recess 183 by means of a diametrical port 184 and communicates at its other end with an annular recess 185 by means of a diametrical port 186. Intermediate its ends, the port 182 connects with the adjacent periphery of the valve by means of opposed recesses 187. The valve also has a pair of annular recesses 188 and 189 formed therein which operate in a manner hereinafter more fully set forth.

The housing 36 has a number of ports and passages formed or cored therein which cooeprate with the valve in variously directing the fluid from the pump to the motor. Thus, as illustrated in Figs. 1, 3, 4, 5 and 9, an annular fluid supply passage 190 communicates with the midportion of the bore 180 and is also connected to the pump outlet passage 45. An annular passage 191 to the right of the passage 190 (Fig. 3) communicates with the motor passage 92 by means of a recess 192 (Fig. 1) and therethrough with the ports 93 to supply fluid to the motor during clockwise rotation thereof when looking at the right hand end of Fig. 1. Fig. 4 shows the valve in the position for effecting such clockwise rotation of the motor. An annular passage 193 positioned to the left of the passage 190 (Fig. 3) is connected by means of a recess 194 (Fig. 1) with the motor passage 90 and through said passage with the motor ports 91 for receiving the fluid discharged by the motor when rotating in a clockwise direction and with the valve located as shown in Fig. 4.

The housing 36 is also formed with an annular recess 195 as shown at the right hand end of Figs. 3, 4 and 5 and an annular recess 196 as shown at the left hand of said figures, together with a passage 197 extending upwardly from the recess 195, a passage 198 extending upwardly from the recess 196 and a suitable interconnecting passage 199 between the upper ends of the passages 197 and 198. These last mentioned recesses and passages are for receiving fluid from the discharge side of the motor and also from an outlet port 200 of the rotary pump 155.

The means for braking the motor consists essentially of means for preventing or restricting the discharge of fluid by the motor while at the same time maintaining the inlet ports to the motor and the cylinders filled with fluid. As illustrated herein, the housing 36 is provided with annular recesses 201 and 202 communicating with the bore 180 adjacent the recesses 195 and 196, respectively. Ports 203 and 204 connect these recesses respectively with the passages 197 and 198. These ports are normally closed by means of check valves 205 and 206 which are pressed into engagement with annular seats 207 and 208 by means of coiled springs 209 and 210, the tension of which is adjustable by means of screw devices 211 and 212.

In a manner more fully described hereinafter, the pump 155 is connected to supply fluid under pressures of one hundred to one hundred fifty pounds per square inch to the return portion of the circuit from the outlet of the motor 14 to the inlet of the pump 13. This pressure is preferably maintained by means of a pressure operated bypass valve designated generally 215 (Fig. 3). This valve comprises a supporting member 216 which is secured to a depending portion 217 of the housing 36 by means of a pipe connection 218 which communicates at its upper end with a chamber 219 in the housing 36 and at its lower end with a port 220 in the valve casing 216. The port 220 communicates with an annular chamber 221, from which fluid is arranged to flow out through a central discharge port 222, the intervening portion of the casing forming an annular valve seat 223 against which a flat disk-like valve 224 is urged by a coiled spring 225. Preferably, the disk valve 224 is mounted on a diaphragm 226 which is clamped between one face of the valve casing 216 and the adjacent face of a cup-shaped closure 227 which houses the spring 225 and forms a support for a spring adjusting screw device 228. Fluid passing out through the port 222 is permitted to flow into the reservoir 12 in the lower portion of the casing 10.

In order to relieve the pressure in the high pressure supply passage 199 in the event the motor is accidentally stalled, a high pressure relief valve 230 is preferably included in the manner illustrated in Fig. 3. This valve is normally seated against an annular seat 231 surrounding the discharge end of a high pressure relief port 232, the other end of which is connected to the passage 199 by means of a recess 233. A coiled spring 234 is positioned intermediate the valve 230 and a plug 235 screw-threaded in the housing 36 so as to maintain the valve 230 seated under normal working conditions. Fluid is supplied to the inlet of the rotary pump 155 by means including a conduit 240 (Fig. 1) which connects at its upper end to an inlet port 241 of the pump and connects at its lower end to a port 242 formed in the left hand end wall of the casing 10. The port 242 in turn communicates with a strainer chamber 243 formed in a detachable plate 244, the fluid in the reservoir 12 being arranged to flow into the chamber 243 through a suitable strainer 245. The strainer is mounted on the plate 244 (which is preferably detachable from the casing 10) so that it may be removed for cleaning and renewal purposes.

In order to cool the fluid, the casing 10 is preferably provided with an air channel 250 which extends through the body of the fluid, the normal level of which is indicated at 251. Furthermore, the fluid discharged from the port 222 is preferably conducted by means of suitable conduits (not shown) to ports 253 and 254 (Fig. 1) formed respectively in the upper portions of the cylinder blocks 27 and 60. From these ports, the fluid is sprayed through nozzle-like ports 255 and 256 onto the wobbler devices so as to lubricate the wobbler devices and adjacent bearings and mechanism. This treatment of the fluid also results in cooling of the fluid as well as lubrication of the mechanism.

Fig. 9 illustrates diagrammatically, and in a simplified manner, the principal parts and the fluid circuit of the preferred form of the invention. The valve 170 is shown in its neutral position, the same as in Fig. 3. The pump 155 is shown with an inlet port 155' and an outlet port 155" which communicates with the outlet passage 199. The high pressure relief valve 230 is illustrated controlling a passage 232 which extends directly between the outlet passage of the pump and the inlet passage thereto. In this figure, a conduit 260 is shown for conducting the bypassed fluid back to the reservoir 12 in order to complete the fluid circuit.

In operating the preferred form of the invention, the prime mover 19 drives the pump shaft 20 in a clockwise direction, as viewed from the right hand end of Fig. 1. The shaft 22 of the motor 14 may be connected to a device to be driven at variable speeds. The reservoir 12 and the fluid circuit are filled with a suitable operating fluid such as oil. With the parts in the position illustrated in Figs. 1 to 3 and 6 to 9, the pump 13 is set at substantially zero stroke, and the motor 14 is set at approximately maximum stroke. The valve 170 is in its neutral position. Upon turning the hand wheel 143 (Fig. 6) in a counter-clockwise direction so as to increase the stroke of the pump, fluid is discharged by the pump into the supply passage 199. Since the valve is in the neutral position shown in Fig. 3, this fluid passes through the openings 187 and the axial port 182 of the valve and thence through the ports 184 and 186 and into the recesses 195 and 196 (Fig. 3). Since the pump 155 is in operation and is also supplying fluid through the port 200 and the intermediate passages 197 and 198 to the recesses 195 and 196, the excess fluid passes out through the pipe connection 218 and past the valve 224. The fluid discharged is conducted to the lubricating ports 253 and 254 and is discharged through the nozzles 255 and 256 onto the wobbler mechanisms. Under these conditions, the inlet and outlet ports of the motor 14 are subjected to the same pressure with the result that the motor does not operate.

Upon shifting the valve 170 to the position illustrated in Fig. 4, fluid from the supply passage 199 passes into the annular passage 181 and onto the motor passage 92 and motor ports 93. When the ports 93 are used as supply or inlet ports for the motor, the motor shaft 22 will operate in a clockwise direction as viewed from the right hand end of Fig. 1. The speed of the motor will depend upon the position of the hand wheel 143, the connections intermediate the motor stroke adjusting bar 100 and the pump stroke adjusting member 54 being such as to cause the stroke of the motor to be shortened as the stroke of the pump is increased. Thus, as the volume of the fluid discharged by the pump increases from zero to a maximum, the volumetric capacity of the motor decreases from a maximum to a minimum to provide an extremely wide range of speeds of the shaft 22. With the valve 170 in the position shown in Fig. 4, the fluid discharged by the motor 14 passes out through the ports 91 (Fig. 1) and passage 90 and through the intermediate recess 194 to the annular passage 193. From this passage, the fluid passes through the opposed recesses 187 of the valve and into the axial port 182 thereof, the fluid then discharging through the diametrical port 186 into the return recess 196. With the valve in the position shown in Fig. 4, the speed of the motor shaft 22 may be varied by operating the hand wheel 143.

In order to stop the motor and apply a braking effect thereto, the valve 170 is moved to the position shown in Fig. 5. When in this position, the fluid discharged by the motor into the annular passage 193 is shut off from direct communication with the axial bore 182 of the valve because the opposed recesses 187 of the valve have been moved out of communication with the passage 193. Fluid from the passage 193 can only escape through the port 204 and in order to do so must open the valve 206 against the action of the spring 210. The spring is selected of the proper strength to create the desired braking action. In order to maintain the cylinders of the motor filled with fluid during the braking period, the annular supply passage 191 remains in communication with the fluid supply and return circuits as shown in the right hand portion of Fig. 5.

When it is desired to operate the motor in a reverse direction, it is merely necessary to shift the valve 170 to its extreme right hand position wherein the detent device 175 (Fig. 3) engages the annular groove 179. After operation in the reverse direction, movement of the valve so that the detent device engages in the groove 178 causes a braking action in a manner similar to that already described with respect to Fig. 5. If no braking action is desired, the valve 170 may be moved directly to the position shown in Fig. 3. Furthermore, if no braking action is desired, the check valves 205 and 206 may be removed. If braking action is desired for only one direction of rotation, the corresponding check valve may be removed.

If for any reason the pressure in the motor supply passage 190 exceeds a safe value, the valve 230 is arranged to open and permit the fluid to return to the reservoir through the pipe 218 and past the valve 224. It is contemplated that the spring 234 will be selected of such strength that the valve 230 will be closed under all normal operating conditions, but so that the valve will open if, for example, the motor shaft 22 is stalled.

It is believed readily apparent that the invention in its preferred form provides for a wide range of speeds of the motor shaft and embodies a simple control mechanism for adjusting this speed. With the prime mover operating, the starting, stopping, braking and reversing of the motor are entirely under the control of the valve 170. By providing means for cooling the fluid, as well as a means for using the bypassed fluid for lubricating the parts of the pump and motor, the transmission is readily adapted for continuous operation over long periods of time.

The provision of a make-up pump such as the pump 155 for maintaining fluid at a predetermined pressure at the intake of the pump and the outlet of the motor, insures the complete filling of the pump cylinders on the intake strokes and reduces noise and heating. If the pump cylinders were not completely filled by fluid under pressure, there would be a tendency for fluid to flow from the discharge passage of the pump back into the cylinders which are about to discharge in order to fill the space caused by the incomplete filling of the cylinder during the suction stroke of its piston. The elimination of such return flow from the pressure side to the incompletely filled cylinders is effective to reduce the heating and eliminate noise. Furthermore, by providing a pump means for maintaining a pressure on the intake of the main pump, the fluid supplied to the main pump serves as a means for moving the pump pistons through their suction stroke.

In the preferred form of the invention, the pump and motor shafts are aligned and the pump casing and motor casing are rigidly secured together by means including the housing 36. The rotary pump also has its driving shaft aligned with the pump 13, this facilitating the driving of the rotary pump by means of a shaft connected to the adjacent end of the pump shaft 20. As shown in Figs. 1 and 6, the eccentric 150 of the control mechanism is in its "dead center" position to the left of the axis of the shaft 136, this position of the control mechanism corresponding to the zero stroke position of the pump wobbler.

I claim as my invention:

1. A fluid transmission comprising, in combination, a pump having a drive shaft, a plurality of parallel piston and cylinder devices arranged annularly about an intermediate portion of said shaft, an adjustable wobbler on said shaft for actuating the pistons of said devices, means for adjusting said wobbler comprising a pump control element movable longitudinally on said intermediate portion of said shaft and a pump control member connected at one end to said element and extending outwardly intermediate adjacent cylinders of the pump, a motor having a driven shaft, a plurality of parallel piston and cylinder devices arranged annularly about an intermediate portion of said driven shaft, an adjustable wobbler on said shaft operable by the motor pistons, means for adjusting said wobbler comprising a motor control element slidably mounted on said intermediate portion of the driven shaft and a motor control member having one end connected to said element and its other end extending outwardly intermediate adjacent cylinders of the motor, means for controlling the flow of fluid from said pump to said motor, and means for simultaneously adjusting the strokes of the pump and motor pistons connected to the outwardly extending ends of said pump and motor control members.

2. A fluid transmission comprising, in combination, a pump having a drive shaft, a plurality of parallel piston and cylinder devices arranged annularly about an intermediate portion of said shaft, an adjustable device on said shaft for actuating the pump pistons, means for adjusting said device comprising a pump control element movable longitudinally of said intermediate portion of said shaft, a ball bearing having one race secured to said pump control element and a pump control lever connected at one end to the outer race of said bearing and extending outwardly intermediate adjacent cylinders of the pump, a motor having a driven shaft, a plurality of parallel piston and cylinder devices arranged annularly about an intermediate portion of said driven shaft, an adjustable device on said shaft operable by the motor pistons, means for adjusting said last mentioned device comprising a motor control element movable longitudinally of said intermediate portion of the driven shaft, a ball bearing having one race secured to said motor control element and a motor control lever having one end connected to the other race of said bearing and its other end extending outwardly intermediate adjacent cylinders of the motor, means for controlling the flow of fluid from said pump to said motor, and means for simultaneously adjusting the strokes of the pump and motor pistons connected to the outwardly extending ends of said pump and motor control levers.

3. A fluid transmission comprising, in combination, a casing, a fluid reservoir in the lower portion of said casing, a pump having inlet and outlet ports, a motor having inlet and outlet ports, said pump and motor being positioned in the upper portion of said casing, means forming a supply passage between the outlet port of the pump and the inlet port of the motor, means forming a return passage from the outlet port of the motor to the inlet port of the pump, an auxiliary pump having a discharge port connected to said return passage to supply fluid under pressure to the inlet of the first mentioned pump, a fluid operated valve for discharging excess fluid from said return passage, and means for directing said excess fluid onto the pump and motor parts to lubricate said parts and cool said fluid prior to its return to said reservoir.

4. A fluid transmission comprising, in combination, a casing, a reservoir located in said casing, a pump having a drive shaft, a plurality of piston and cylinder devices, a wobble plate driven by said shaft for actuating the pump pistons and means for controlling the inlet and outlet of fluid to and from the pump cylinders, a motor having a driven shaft, a plurality of piston and cylinder devices, a wobble plate carried by said motor shaft for converting the reciprocatory movement of the motor pistons into rotary movement of the motor shaft and means for controlling the inlet and outlet of fluid to and from the motor cylinders, means forming a supply passage connecting the outlet of the pump to the inlet of the motor, means forming a return passage from the outlet of the motor to the inlet of the pump, means for withdrawing fluid from said reservoir and for discharging said fluid under pressure into said return passage, and means for conducting excess fluid from said return passage and discharging said excess fluid onto the wobble plates of the pump and motor to lubricate said parts and to cool the fluid prior to its return to said reservoir.

5. A fluid transmission comprising, in combination, a pump having a drive shaft, a plurality of piston and cylinder devices, means at one end of the cylinders operable by the drive shaft for actuating the pistons, a valve driven from said shaft positioned adjacent the other end of said cylinders for controlling the inlet and outlet of fluid to and from the cylinders, a motor having a driven shaft, a plurality of piston and cylinder devices, means carried by said motor shaft for converting the reciprocatory movement of the motor pistons into rotary movement of the motor shaft, and means including a valve driven from one end of the motor shaft for controlling the inlet and outlet of fluid to and from the motor cylinders, a supporting structure for said pump and said motor placing the pump and motor shafts in alinement and with their valve operating ends positioned toward each other including a stationary element intermediate the adjacent ends of the pump and motor, fluid passages formed in said stationary element connecting the pump outlet to the motor inlet and the motor outlet to the pump inlet, valve mechanism in said stationary element interposed in the fluid passages and including a shiftable valve member to control the starting, stopping and reversing of said motor, an auxiliary pump also located in said stationary element and driven from the adjacent end of said pump shaft, a supply passage for said auxiliary pump opening outwardly of said stationary element, and a discharge passage formed wholly within said stationary member and opening to the passage connecting the motor outlet to the pump inlet intermediate said valve mechanism and the pump inlet to supply make-up fluid under pressure to the inlet of said pump.

6. A fluid transmission comprising, in combination, a pump having inlet and outlet ports, a motor having inlet and outlet ports, means forming a discharge passage leading from the outlet port of said pump, a return passage leading to the inlet port of said pump and passages leading to the inlet and outlet ports respectively of said motor, valve mechanism interposed between the passages of said pump and the passages of said motor including a valve member having start, stop and brake positions, a by-pass passage in said valve mechanism leading to said return passage for said pump, said by-pass passage including a spring pressed check valve, and said valve member in its brake position causing the fluid discharged from said motor to flow through said by-pass passage to brake the motor.

7. A fluid transmission comprising, in combination, a pump having inlet and outlet ports, valve means controlling said ports, a motor having inlet and outlet ports, valve means controlling said motor ports, means forming a discharge passage leading from the outlet port of said pump, means forming a return passage leading to the inlet port of the pump, means forming passages leading to the inlet and the outlet ports of said motor alternately serving as supply or discharge passages depending upon the direction of operation of said motor, a reversing valve mechanism including a valve housing having a longitudinal bore to which said passages open, passages leading from the bore in said housing to the return passage for said pump, a spring pressed valve for each of said last named passages permitting flow only from the bore to said return passage, and a shiftable valve member having forward and reverse positions and intermediate stop positions, one for each direction of operation of said pump, said valve member when in an intermediate stop position connecting the discharge passage of said pump with said return passage for said pump, connecting the then discharge passage for said motor with the return passage for said pump through one of said spring valve control passages, and connecting the then supply passage for said motor with said return passage for said pump to brake the motor.

8. A fluid transmission comprising, in combination, a pump having a drive shaft, a plurality of parallel piston and cylinder devices arranged annularly about an intermediate portion of said shaft, an adjustable wobbler on said shaft for actuating the pistons of said devices, means for adjusting said wobbler comprising a pump control element movable longitudinally of and adjacent said intermediate portion of said shaft and a pump control member connected at one end to said element and extending outwardly intermediate adjacent cylinders of the pump, a motor having a driven shaft, a plurality of parallel piston and cylinder devices arranged annularly about an intermediate portion of said driven shaft, an adjustable wobbler on said shaft operable by the motor pistons, means for adjusting said wobbler comprising a motor control element movable longitudinally and adjacent of said intermediate portion of the driven shaft, a motor control member having one end connected to said element and its other end extending outwardly intermediate adjacent cylinders of the motor, and means for adjusting the strokes of the pump and motor pistons connected to the outwardly extending ends of said pump and motor control members.

9. A fluid transmission comprising, in combination, a casing, a fluid reservoir in said casing, a pump in said casing having inlet and outlet ports, a motor in said casing having inlet and outlet ports, means forming a supply passage between the outlet port of the pump and the inlet port of the motor, means forming a return passage from the outlet port of the motor to the inlet port of the pump, an auxiliary pump having a discharge port connected to said return passage to supply fluid under pressure to the inlet of the first mentioned pump, and means for discharging excess fluid from said auxiliary pump onto the first mentioned pump and motor parts to lubricate said parts.

GUNNAR A. WAHLMARK.